United States Patent [19]

Suyama et al.

[11] Patent Number: 4,914,169

[45] Date of Patent: Apr. 3, 1990

[54] METHOD OF POLYMERIZING VINYL CHLORIDE

[75] Inventors: Shuji Suyama; Tomoyuki Nakamura, both of Aichi, Japan

[73] Assignee: Nippon Oil and Fats Company, Limited, Japan

[21] Appl. No.: 193,577

[22] Filed: May 13, 1988

[30] Foreign Application Priority Data

May 21, 1987 [JP] Japan ................................ 62-122543

[51] Int. Cl.$^4$ ............................................... C08F 4/38
[52] U.S. Cl. .................................. 526/228; 526/344.2
[58] Field of Search ........................................ 526/228

[56] References Cited

U.S. PATENT DOCUMENTS 4,063,013 12/1977 Friedman ............................ 526/227
4,515,929 5/1985 Tang ................................... 526/228

FOREIGN PATENT DOCUMENTS 2074589 11/1981 United Kingdom .

Primary Examiner—Christopher Henderson
Attorney, Agent, or Firm—Arnold, White & Durkee

[57] ABSTRACT

Excellent polymers of vinyl chloride series monomers having a good thermostability to prevent coloring and not having displeasant odor can be provided with even polymerization speed at high yield by using a specific combination system of a fast initiator and retarded initiators.

7 Claims, 1 Drawing Sheet

METHOD OF POLYMERIZING VINYL CHLORIDE

BACKGROUND OF THE INVENTION

1. Field of the Invention

The present invention relates to a method of polymerizing vinyl chloride monomers or vinyl chloride monomers and monomers copolymerizable with the vinyl chloride monomers (to be referred to as "vinyl chloride series monomers" or simply "vinyl chloride", hereinafter).

2. Related Art Statement

In polymerizing vinyl chloride series monomers, the reaction speed is rapidly increased at the later period of the polymerization. Namely, an autocatalytic behavior is seen. At this period a marked exothermic heat is occurred, so that a cooling ability of an apparatus used for the polymerization must be designed maximum to meet or compensate the maximum of the exothermic heat. As a result, the cooling device of the apparatus has to be operated with a far lower cooling than the maximum cooling ability before the maximum of the exothermic heat. Hence, in order to utilize the cooling ability of the apparatus maximum, a so-called isokinetic polymerization which exhibits a stable exothermic heat from the initial to the later period of the polymerization, has been heretofore desired.

For that purpose, a means has been adopted of uniforming the polymerization reaction speed by co-using a fast polymerization initiator which exhibits a large reaction speed at the initiation period of the reaction and a retarded polymerization initiator which exhibits a large reaction speed at the later period of the reaction.

In such a case, as the retarded polymerization initiator, use is made of conventional polymerization initiator of which a temperature of a half life of 10 hours in a 0.1 mol solution thereof in benzene (to be referred to as "half life temperature at 10 hours" or "$T_{\frac{1}{2}}(1 H)$", hereinafter) becomes within a range of 40°–65° C. Illustrative examples thereof are t-butyl peroxy neodecanoate (abbreviated as "BND", hereinafter), 3,5,5-trimethyl hexanoyl peroxide (abbreviated as "INPO", hereinafter), bis(2-ethyl hexyl)peroxydicarbonate (abbreviated as "OPP", hereinafter), and the like.

As the fast polymerization initiator, development and use is made of polymerization initiator of which $T_{\frac{1}{2}}(10H)$ becomes 40° C. or less. Illustrative examples thereof are acetyl cyclohexyl sulfonyl peroxide (abbreviated as "ACSP", hereinafter), cumyl peroxy neodecanoate (abbreviated as "CND", hereinafter), 1,1,3,3-tetramethylbutyl peroxy neodecanoate (abbreviated as "OND", hereinafter), and the like.

Isokinetic polymerization has been possible by combining the above fast polymerization initiator and the retarded polymerization initiator and adjusting the mixing ratio and the use amounts thereof. However, physical properties of obtained polymers are not always satisfactory. For example, ACSP has drawbacks of producing an unsanitary decomposition product and a thermally unstable polymer (colored during the polymerization). CND produces a polymer having a peculiar odor because of its decomposition product. OND is inferior to ACSP and CND in polymerization activity, so that it has less effect as the fast polymerization initiator, though it has no trouble with regard to physical properties of the obtained polymer.

SUMMARY OF THE INVENTION

An object of the present invention is to obviate the abovementioned drawbacks of prior art.

The inventors have made many studies and researches on the above drawbacks of prior art leading to the present invention to find out that usage of specific combinations of polymerization initiators afford isokinetic polymerization and thermally stabilized, excellent coloring property and odorless polymers.

The present invention is a method of polymerizing vinyl chloride in the co-existence of a fast polymerization initiator and a retarded polymerization initiator, wherein (A) pinane peroxy neodecanoate is used as the fast polymerization initiator, and (B) at least one of peroxy ester, diacylperoxide and peroxy dicarbonate of which a half life temperature at 10 hours becomes within a range of 40°–65° C. is used as the retarded polymerization initiator.

Vinyl monomers that can be copolymerized with vinyl chloride monomers are ethylene, vinyl acetate, vinylidene chloride, styrene, acrylic acid esters, etc., for example.

The amount of pinane peroxy neodecanoate to be added is generally 0.001–0.5 parts by weight, preferably 0.01–0.2 parts by weight, calculated as pure substance, relative to 100 parts by weight of the vinyl chloride. If the amount is less than 0.001 parts by weight, the polymerization speed is untolerably retarded. While, if the amount exceeds 0.5 parts by weight, the polymerization reaction becomes difficult to control, and the physical properties of the obtained polymer become inferior.

Pinane peroxy neodecanoate is obtained, for example, by reacting pinane hydroperoxide with neodecanoic acid chloride in the presence of a potassium hydroxide solution.

Illustrative examples of peroxy ester are BND ($T_{\frac{1}{2}}(10H)$ (hereinafter the same)=46.5° C.), t-butyl peroxy neohexanoate (52.1° C.), t-butyl peroxy pivalate (55° C.), and the like.

Illustrative examples of diacyl peroxide are INPO (59.5° C.), lauroyl peroxide (62° C.), octanoyl peroxide (62° C.), and the like.

Illustrative examples of peroxy dicarbonate are OPP (43.5° C.), di(2-ethoxyethyl) peroxy dicarbonate (43.4° C.), di-n-propyl peroxydicarbonate (40.5° C.), and the like.

The amount of the retarded initiator is, generally, about ¼–4 times of the amount of pinane peroxy neodecanoate.

Means used for polymerization in the present method can be usual suspension polymerization method or emulsion polymerization method. Polymerization is effected usually at 20°–75° C., preferably at 30°–69° C. If the temperature is lower than 20° C., the polymerization is liable to be prolonged. While, if the temperature exceeds 75° C., the life of the initiators becomes short.

DETAILED DESCRIPTION OF THE DRAWING

Figure 1:
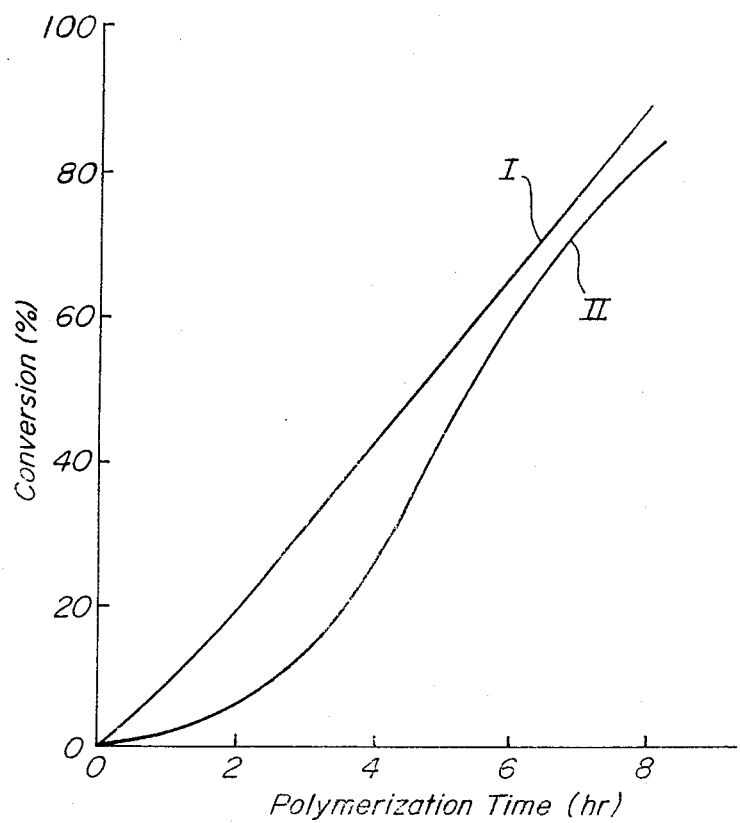

For a better understanding of the present invention, reference is made to the accompanying drawing, in which:

FIG. 1 is a characteristic graph showing relations between the polymerization time and the conversion percentage.

DESCRIPTION OF THE PREFERRED EMBODIMENTS

Hereinafter, the present invention will be explained in more detail with reference to examples.

REFERENTIAL EXAMPLE 1

(Synthesis of pinane peroxy neodecanoate)

One liter capacity four-necked flask equipped with an agitator is charged with 216.4 g of a 35% KOH aqueous solution, and added under agitation with 289.7 g of 52.9% pinane hydroperoxide, while retaining the solution temperature at 20° C. Further 143.1 g of neodecanoic acid chloride is added dropwise over 10 min., while agitating and retaining the solution temperature at 20° C. After agitation of 1 hr., 170 g of cold water is added to the solution, and additional agitation is effected for 5 min. Then, the solution is left still for phase separation. Water phase is removed by separation to leave an oily phase. The oily phase is washed with 300 g of 5% NaOH aqueous solution, subsequently three times with water, and dried over anhydrous magnesium sulfate. Thus, 325.2 g of pinane peroxyneodecanoate solution of a purity of 54.5% is obtained. Yield is 72.8 mol%.

EXAMPLE 1

Capacity 400 ml stainless steel autoclave is charged with 200 ml of ion exchanged water and 0.1 part by weight of polyvinyl alcohol. The mixture is solved, added with 0.05 part by weight of the above obtained pinane peroxyneodecanoate (abbreviated as "PND", hereinafter), calculated as pure substance, further added with 0.05 part by weight of BND calculated as pure substance, then cooled to below -80° C., and added with 100 parts by weight of vinyl chloride monomers. After complete substitution of the atmosphere in the space of the autoclave by nitrogen gas, the autoclave is sealed, and immersed in an isothermal water tank held at 50° C. for 8 hr. to effect polymerization. The autoclave is agitated in the tank by rotating it at 32 rpm. These polymerization conditions are shown in the following Table 1. After the polymerization, the autoclave is cooled. Unreacted vinyl chloride monomers are removed. Thus obtained white powders are washed twice with each 100 ml of water, and dried in vacuo. Thus, a polymer of vinyl chloride is obtained with an yield of 88% calculated from the obtained polymer weight.

A relation between polymerization time and conversion percentage of Example 1 is shown as curve in the attached FIG. 1. Apparently, the polymerization reaction speed is uniform over the entire reaction period.

Also, a relation between polymerization time and conversion percentage of Referential Example 3 is shown as curve II in FIG. 1. It is clear that the polymerization reaction speed of curve II of Referential Example 3 is low as compared with curve I of Example 1 and uneven over almost whole reaction period.

TABLE 1

| | | | | (parts by weight) | | | | |
|---|---|---|---|---|---|---|---|---|
| | | Example | | | | Reference | | |
| | | 1 | 2 | 3 | 4 | 1 | 2 | 3 | |
| Vinyl chloride Monomer[1] | | 100 | 100 | 100 | 90 | 100 | 100 | 100 | Remarks for type of initiator |
| Vinyl acetate monomer[1] | | 0 | 0 | 0 | 10 | 0 | 0 | 0 | |
| Initiator | PND[2] | 0.05 | 0.05 | 0.05 | 0.05 | | | | Fast |
| | BND[3] | 0.05 | | | 0.05 | 0.05 | 0.05 | 0.05 | Retarded |
| | INPO[4] | | 0.05 | | | | | | |
| | OPP[5] | | | 0.05 | | | | | |
| | ACSP[6] | | | | | 0.05 | | | |
| | CND[7] | | | | | | 0.05 | | |
| | OND[8] | | | | | | | 0.05 | |
| Yield[9] of Copolymer (%) | | 88 | 80 | 87 | 77 | 93 | 90 | 82 | |

Note:
[1] Calculated as pure substance
[2] Pinane peroxy neodecanoate
[3] t-butyl peroxy neodecanoate
[4] 3,5,5-trimethyl hexaganol peroxide
[5] Bis (2-ethyl hexyl) peroxydicarbonate
[6] Acetyl cyclohexyl sulfonyl peroxide
[7] Cumyl peroxy neodecanoate
[8] 1,1,3,3-trimethyl butyl peroxy neodecanoate
[9] Polymerization temperature of 50° C. for 8 hr.
[10] Though some yields of Reference are superior to Examples, such polymers are inferior in physical properties such as coloring property, odor or the like, which are drawbacks of prior art.

For testing a thermostability, the obtained polymers of vinyl chloride are subjected to the following coloring test and an odor test. The results of the tests are shown in the following Table 2.

Coloring test 100 parts by weight of polymer of vinyl chloride, 2.5 parts by weight of dibutyl tin maleate, and 80 parts by weight of dioctylphthalate as a plasticizer, are mixed, kneaded on a roll at 160° C. for 10 min., and shaped into a sheet of 1 mm thickness, for each example. The extent of coloring of the sheets is observed and determined by the naked eye.

TABLE 1

| | | Coloring | Odor |
|---|---|---|---|
| Example | 1 | Good without coloring | Good without odor |
| | 2 | " | " |
| | 3 | " | " |
| | 4 | " | " |
| Reference | 1 | Bad because of yellow coloring | Bad because of strong odor |
| | 2 | Good without coloring | " |
| | 3 | " | Good without odor |

EXAMPLES 2 and 3

Polymerization of vinyl chloride monomers of Example 1 is repeated, except that INPO and OPP are respectively used as an initiator instead of BND, as shown in the above Table 1. Polymerization conditions and yields of polymers are also shown in Table 1. The coloring test and the odor test are performed in the same manner as in Example 1. The results are shown in the above Table 2.

EXAMPLE 4

Polymerization of Example 1 is repeated, except that 100 parts by weight of vinyl chloride monomers are replaced by 90 parts by weight of vinyl chloride monomers and 10 parts by weight of vinyl acetate monomers for effecting copolymerization. Used conditions for polymerization and yield of copolymer are shown in the above Table 1. The coloring test and the odor test are effected in the same manner as in Example 1. The results are shown in the above Table 2.

REFERENTIAL EXAMPLES 1-3

Polymerization of Example 1 is repeated, except that conventional ACSP, CND and OND are respectively used as an initiator instead of PND. The conditions for polymerizations and yields of polymers are shown in the above Table 1. The coloring test and the odor test are performed in the same way as in Example 1. The results are shown in the above Table 2.

As seen clearly from the above Tables 1 and 2, though the same retarded initiator is used, the conventional methods of using prior fast initiator as a fast initiator result in drawbacks of either bad thermostability (coloring), bad odor or both, or low yield even if thermostability and odor are good. In contrast, the present method does not have such drawbacks.

Good thermostability is advantageous in working or processing the obtained polymer. Non-odor is desirable from the viewpoint of keeping or realizing a sanitary environment in the shaping and working processes.

The present invention which uses specific initiators has the following advantages.

The obtained polymers have good physical properties of non-odor and thermostability (non-coloring during the polymerization), particularly non-coloring, as compared with those obtained by conventional methods of using prior initiators such as ACSP or CND, in the initiators system.

The polymerization speed can be made even or uniform as compared with the conventional methods of using prior initiator such as OND as the fast initiator, so that the present method can afford an excellent polymer yield.

Therefore, the present invention is eminently useful industrially.

Though the present invention has been described with specific examples and numeral values, it is of course apparent to those skilled in the art that various changes and modifications thereof are possible without departing from the broad spirit and aspect of the present invention as hereinafter claimed.

What is claimed is:

1. A method of polymerizing vinyl chloride series monomer in the co-existence of a fast polymerization initiator and a retarded polymerization initiator, wherein
   (A) from 0.001 to 0.5 parts by weight of pinane peroxy neodecanoate is used as the fast polymerization initiator per 100 parts by weight vinyl chloride, and
   (B) at least one of peroxy ester, diacyl peroxide and peroxy dicarbonate of which a half life temperature at 10 hours becomes within a range of 40°–65° C. is used as the retarded polymerization initiator.

2. The method of claim 1 wherein from 0.01 to 0.2 parts by weight of pinane peroxy neodecanoate is used per 100 parts by weight vinyl chloride.

3. The method of claim 1 wherein said peroxy ester is selected from the group consisting of t-butyl peroxy neodecanoate, t-butyl peroxy neohexanoate, and t-butyl peroxy pivalate.

4. The method of claim 1 wherein said diacyl peroxide is selected from the group consisting of 3,5,5-trimethyl hexanoyl peroxide, lauroyl peroxide, and octanoyl peroxide.

5. The method of claim 1 wherein said peroxy dicarbonate is selected from the group consisting of bis(2-ethyl hexyl)peroxy dicarbonate, di(2-ethoxyethyl)-peroxy dicarbonate, and di-n-propyl peroxydicarbonate.

6. The method of claim 1 wherein said vinyl chloride series monomers are polymerized at a temperature in a range of from 20° to 75° C.

7. The method of claim 1 wherein said temperature range is from 30° to 69° C.

* * * * *